United States Patent
Glaubitt et al.

(10) Patent No.: US 8,354,165 B2
(45) Date of Patent: Jan. 15, 2013

(54) SUBSTRATES SUPPLIED WITH A DUST AND AEROSOL-REPELLENT COATING, METHOD FOR THE PRODUCTION THEREOF AND MATERIALS FOR THIS PURPOSE

(75) Inventors: Walther Glaubitt, Margetshöchheim (DE); Wolfgang Graf, Eschbach (DE); Andreas Gombert, Freiburg (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 310 days.

(21) Appl. No.: 12/674,178

(22) PCT Filed: Aug. 13, 2008

(86) PCT No.: PCT/EP2008/060625
§ 371 (c)(1),
(2), (4) Date: Apr. 19, 2010

(87) PCT Pub. No.: WO2009/024511
PCT Pub. Date: Feb. 26, 2009

(65) Prior Publication Data
US 2011/0129662 A1    Jun. 2, 2011

(30) Foreign Application Priority Data
Aug. 20, 2007  (DE) .......... 10 2007 039 164

(51) Int. Cl.
*B32B 5/16* (2006.01)
*C09D 5/00* (2006.01)
*B05D 3/02* (2006.01)
*B82Y 30/00* (2011.01)

(52) U.S. Cl. ........ 428/323; 428/325; 428/328; 428/329; 428/331; 428/426; 428/428; 106/2; 427/372.2

(58) Field of Classification Search .............. None
See application file for complete search history.

(56) References Cited

U.S. PATENT DOCUMENTS
4,830,879 A    5/1989    Debsikdar
(Continued)

FOREIGN PATENT DOCUMENTS
DE        103 51 467        6/2005
(Continued)

OTHER PUBLICATIONS

Glaubitt W et al: High transmission float glass for solar applications; Glass Science and Technology; vol. 73; No. 6; Jun. 1, 2000; cited in international search report.
(Continued)

*Primary Examiner* — David Sample
(74) *Attorney, Agent, or Firm* — Gudrun E. Huckett

(57) ABSTRACT

The present invention relates to a coating material containing (a) first oxidic particles formed by hydrolytic condensation, in a size range of 5-20 nm, (b) second particles with a diameter in the size range of 80-300 nm, (c) a first aqueous solvent in which the source material for the oxidic particles formed by hydrolytic condensation can be dissolved and which allows or promotes the hydrolysis and condensation thereof, and (d) at least one second solvent, selected among specifically defined alcohols, ethers, organic acids, esters, ketones, amines and amic acids and mixtures thereof. The invention relates in addition to a substrate supplied with a coating, particularly a glass suitable for the photovoltaic and warm water collector domain, wherein the coating is composed of at least two particle fractions, wherein the particles of the first fraction have a diameter in the size range of 5-20 nm, and the particles of the second fraction have a diameter in the size range of 80-300 nm, wherein the particles of the second fraction have an average distance from each other, measured from cone to cone of these particles, of on average 20-200 nm, and wherein the particles of the first particle fraction have pores with a pore radius distribution of which the maximum is between 1 and 6 nm. The coating of the substrate can be achieved by means of the named coating material.

25 Claims, 4 Drawing Sheets

U.S. PATENT DOCUMENTS

| | | | |
|---|---|---|---|
| 5,612,128 A * | 3/1997 | Endo et al. | 428/323 |
| 2002/0014090 A1 * | 2/2002 | Tsujino et al. | 65/17.2 |
| 2002/0034627 A1 | 3/2002 | Jacquiod et al. | |
| 2004/0248995 A1 | 12/2004 | Glaubitt et al. | |
| 2004/0258929 A1 | 12/2004 | Glaubitt et al. | |
| 2006/0005877 A1 | 1/2006 | Spivack et al. | |
| 2007/0065680 A1 | 3/2007 | Schultheis et al. | |

FOREIGN PATENT DOCUMENTS

| | | |
|---|---|---|
| JP | 63207869 A | 8/1988 |
| WO | 00/37374 | 6/2000 |
| WO | 00/69976 A1 | 11/2000 |
| WO | 03/027015 | 4/2003 |
| WO | 03/027034 | 4/2003 |

OTHER PUBLICATIONS

Brinley et al: "High efficiency SiO2-TiO2 hybrid sol-gel antireflective coating for infrared applications"; J. Vac. Sco. Technol. A 24(4), 1141-1146, Jul./Aug. 2006.

* cited by examiner

SUBSTRATES SUPPLIED WITH A DUST AND AEROSOL-REPELLENT COATING, METHOD FOR THE PRODUCTION THEREOF AND MATERIALS FOR THIS PURPOSE

BACKGROUND OF THE INVENTION

The present invention concerns a substrate coating that is dust-repellent and is easily cleaned by rain washing off adhering inorganic and organic dirt. The coating imparts to the glass in the preferred embodiments additionally an antireflective property and is suitable therefore in particular for coating glass that is used in devices for solar energy utilization, for example, as plate glass for covering photovoltaic panels and water heating collectors or tubular glass for solar water heating but also optionally for construction glass or the like. For producing the coating, the substrate to be coated is immersed in a coating solution and is then pulled from the solution at an appropriate speed. The wet film that remains on the glass surface is dried and subsequently, as needed, is baked at several hundred degrees, for example, 500° C., for increasing the wear resistance. The technical device or other substrate, furnished with a glass that is finished in this way is suitable primarily in geographical regions in which a lot of dust is present in the atmosphere and, as a result, the energy yield is reduced by dusty irradiation surfaces.

Components of our atmosphere encompass very small gas molecules with diameters below 1 nanometer up to ash particles that have a size of up to 100 µm. The group of aerosols are solid or liquid particles in the air with a typical size between 0.01 and 10 µm as well as—in contrast to greenhouse gases—a very short life span of a few days. Aerosols can be of natural and/or anthropogenic origin (sea salt, mineral dust, sulfate, soot etc.). The particulate materials that are disadvantageous for effective utilization of solar devices are primarily dust with inorganic and organic components that is sparingly soluble in water, or soot or smoke that are primarily comprised of carbon. The smallest of these aerosols have a diameter of 10 nm (ultra-fine dust) that does not form a sediment but instead is deposited as a much larger coagulate of about 100 nm in size by precipitation. Sediment dust has a diameter in the micrometer range, by definition more than 10 µm.

When aerosols are deposited on the glass surface, the transmission is reduced.

Particularly damaging in this connection are particles that collect as a permanent dirt layer on the glass and cannot be removed by rain or wind and require a mechanical cleaning action (for example, with a sponge and brush).

Examinations of soiled glass surfaces of a collector have shown that a dust cover layer is positioned on a smeary base layer that is adhering well. The dust cover layer may be removed by raindrops but not the base layer. It is in particular this permanently acting soiling that impairs the effective utilization of solar devices.

On soiled glass tubes the chemical composition of the surface was analyzed by means of TOF-SIMS methods (time-of-flight secondary ion mass spectroscopy; time-of-flight SIMS). In high intensity Na, K, Mg, Ca, Fe, Al, Si and Pb have been found. In addition to Cl and NO, that form water-soluble compounds, also F and SO have been detected that both may be sparingly soluble when present as $MgF_2$, $CaF_2$ or gypsum. Moreover, organic compounds, including higher fatty acids, are present that are also sparingly soluble and that may explain the smeary, oily consistency of the permanent base layer.

As already explained in DE 103 51 467 A1 it is known to provide articles either with hydrophobic solutions or with hydrophilic photocatalytic layers for avoiding dirt depositions. Hydrophobic surfaces can be generated in various ways. On the one hand, as is conventional in the ceramics industry, a layer that is comprised of an inorganic-organic nano particle network can be crosslinked by means of unsaturated organic groups thermally or by UV light. Typical examples are the inorganic-organic hybrid polymers that are known by the trademark ORMOCER® of the Fraunhofer-Institut für Silicafforschung. On the other hand, there is a plurality of hydrophobic, organic solutions that can be applied after manufacture or even by the customer (for example, solutions that have become known by the trademark "Clear Shield™"). WO 00/37374 illustrates an example of such an approach. The coatings described in this publication are however mechanically not very stable and are also limited, as a result of the organic components, with regard to maximum temperature of use. Moreover, façade glasses are offered with easily cleanable hydrophilic photocatalytic layers. In order to achieve a cleaning effect, activation by UV light is however mandatory. Moreover, the decomposition rate is very low and is not suitable for contact soiling.

WO 03/027015 A1 discloses a hybrid sol which in addition to water and solvent contains two different fractions of $[SiO_x(OH)_y]$-particles with $0<y<4$ and $0<x<2$ wherein the first fraction has a particle size of 4-15 nm and the second fraction an average particle size of 20-60 nm. The sol may be obtained by hydrolytic polycondensation of tetraalkoxysilanes in an aqueous medium containing a solvent wherein silicon oxide hydroxide particles are obtained. A monodisperse silicon oxide hydroxide sol with an average particle size of 20-60 nm is added to the medium when the hydrolytic condensation of the silanes has occurred at least partially. The hybrid sol is suitable for producing wear-resistant $SiO_2$ antireflective layers on substrates, preferably on glass, that are particularly suitable for covers of solar collectors and photovoltaic cells. WO 03/027034 A2 discloses antireflective surface coatings produced based on such sols with a ratio of particles of the first fraction to the particles of the second fraction in the range of 3,000:1 to 250:1. The degree to which these coatings can be dust-repellent or aerosol-repellent is not mentioned in the cited publications. Based on information of those inventors of the present invention that are also inventors of the coatings disclosed in the aforementioned WO publication, in field tests no significant differences with regard to dust deposition between uncoated and coated glass was found.

SUMMARY OF THE INVENTION

It is an object of the invention to provide a coating material that after application onto a glass substrate or another surface forms a layer whose surface is easier to clean than coatings of the prior art even when they are exposed to strong soiling by small and finest atmospheric particles wherein the layer resulting in the end should preferably have a high transparency.

Surprisingly, the object could be solved by providing a coating material containing
(a) oxidic particles in a size range of 5-20 nm formed by hydrolytic condensation,
(b) particles in a size range of 80-300 nm that preferably, but not necessarily, are also oxidic particles,
(c) a first water-containing solvent in which the starting material for the oxidic particles to be formed by hydrolytic condensation is soluble and which enables or enhances its hydrolysis and condensation, and (d) a second solvent, selected from alcohols, ethers, organic acids, esters, ketones, amines, and acid amides of the formulas
ROH,
ROR$^1$,
RCOOH,
RCOOR$^1$,
RC(O)R$^1$,
RCONR$^2{}_2$,
wherein R and R$^1$ are optionally the same or different and have the meaning of unsubstituted or hydroxy, —NHR$^2$, amido, imino, —COOR$^2$, and/or alkoxycarbonyl substituted, saturated or unsaturated, straight-chain or branched alkyl, alkoxy or polyether alkoxy with preferably 1 to 3 alkylene oxide units and preferably a total of 1 to 10 carbon atoms; or wherein R and R$^1$ are linked with one another by forming a ring with formation of an unsubstituted or hydroxy, —NHR$^2$, amido, imino, —COOR$^2$, and/or alkoxycarbonyl substituted or unsaturated, straight-chain or branched alkylene, oxyalkylene or alkylene (poly)oxyalkylene group; with the proviso that R is not an unsubstituted alkyl when the solvent is of the formula ROH, and wherein R$^2$ may be the same or optionally different and is H or C$_1$ to C$_6$ alkyl; and may effect complexing or chelating of the starting material for the hydrolytic condensation of the aforementioned smaller oxidic particles and/or may effect or enhance a slight to medium solvation and/or peptization of the starting materials or of the particles being formed.

The oxidic particles that are obtained by hydrolytic condensation in the size range of 5-20 nm can be generated in a known way by means of sol-gel technology. For example, WO 03/027015 A1 discloses the manufacture of such particles by hydrolytic polycondensation of a tetraalkoxysilane in a basic aqueous solvent that contains an alcohol. However, the present invention is not limited to this type of manufacture and/or to pure silicon dioxides. This is so because any oxidic particles are suitable for the purposes of the invention, independent of the employed cations. For example, metal oxides may be obtained from any silane tetraalkoxide or trialkoxide, that in the latter case contain a further, for example, carbon-bonded residue, or from other hydrolyzable and condensable silanes. Instead, or in combination therewith, compounds, primarily hydroxides or alkoxides, of two-, three-, four- or five-valent ions of the main groups of the periodic table and of the transition metals can be used that, by hydrolysis and condensation with formation of metal-oxide bonds, may be converted into oxides, for example, hydrolyzable metal compounds of magnesium, calcium, boron, aluminum, germanium, tin, titanium or zirconium or a mixture thereof. The (semi) metal ions that (formally) are in their three- and/or four-valent state are preferred in this connection. In any case, in this connection the hydroxides and alkoxides are preferred as starting materials, respectively, in particular straight-chain or branched or cyclic C$_1$ to C$_{10}$ alkoxides.

The larger oxidic particles can be any particles, for example, particles of a silica sol. Instead, also oxides of other and in particular of the metals or semi-metals mentioned above in connection with the smaller dimensioned particles can be used, or the particles can be comprised of titanium dioxide or may contain it in admixture or as a mixed oxide with one or several other metal cations. Further alternatives are particles of a non-oxidic material that at room temperature is insoluble or is sparingly soluble in water, for example, MgF$_2$ or particles with a material of any kind in the interior whose outer "shell" (i.e., the outermost area that is at least approximately 4 to 10 nm thick) is comprised of one of the aforementioned oxidic materials or MgF$_2$. Preferably, these particles are present in a relatively narrow or even very narrow size distribution, or they are even monodisperse (for example, with a size distribution whose maximum is between 100 and 280 nm, preferably between 100 and 150 nm and in which about 80% of the particles are in a range of a diameter deviation of up to 20 nm downwardly and upwardly, or monodisperse particles with a diameter of between approximately 100 nm and approximately 250 nm, for example, at approximately 120 nm). The second particles are substantially spherical and/or have an average diameter of 100 to 150 nm, preferably in the range of 100 nm.

Examples of the first solvent, mentioned under (c), are aqueous solvents that enhance or catalyze the hydrolytic condensation of the above-mentioned starting materials, optionally contain alcohol, and preferably are basic, that may contain as a base for example, ammonia, an amine, polyethylene imine, or the like. For example, methanol, ethanol, i-propanol or n-propanol, n-butanol, i-butanol or t-butanol are used as alcohols. The presence of alcohol is however not mandatory.

The second solvent can be selected from alkoxy alcohols such as methoxypropanol, methoxyethanol, or methoxymethanol, polyalkoxy alcohols (polyether alcohols) with preferably 2 or 3 alkylene oxide units (e.g. CH$_3$CH$_2$—O—CH$_2$CH$_2$—O—CH$_2$CH$_2$OH), preferably lower symmetric or asymmetric ketones such as acetone or methyl isobutyl ketone, preferably lower symmetric or asymmetric ethers such as diethyl ether or dibutyl ether or tetrahydrofurane, esters such as acetic acid ethylester or (poly) alkoxy carboxylic acids such as CH$_3$—O—CH$_2$—O—CH$_2$CO$_2$H or alcohols or polyols with carboxy groups.

Moreover, the invention as a solution to the aforementioned object provides a substrate that is provided with a coating wherein the coating is comprised of at least two particle fractions, wherein the first fraction comprises oxidic particles in a size range of 5-20 nm or is comprised of these particles, and the second fraction comprises particles in a size range of 80-300 nm, preferably 100 nm to 300 nm, that have an average spacing, measured from cone to cone of these particles, of approximately 20-200 nm relative to one another, wherein the particles of the first fraction have pores with a pore radius distribution whose maximum is between 1 and 6 nm.

DESCRIPTION OF PREFERRED EMBODIMENTS

The oxidic particles of the first fraction can be composed as desired. Preferably, they are comprised of silicon dioxide or a mixed oxide of silicon with one or several cations of the main group or the transition metals, preferably with a formal oxidation state of +2, +3, +4, or +5. Preferably, the oxides can be those of magnesium, calcium, boron, aluminum, germanium, tin, titanium or zirconium or mixtures or mixed oxides thereof.

The particles of the second fraction can be of the same or a different composition as the particles of the first fraction; they can also be comprised of silicon dioxide or a mixed oxide of silicon with one or several cations of the main group or the transition metals, preferably with a formal oxidation state of +2, +3, +4 or +5, or of one or several oxides of magnesium, calcium, boron, aluminum, germanium, tin, titanium or zirconium or of mixtures or mixed oxides thereof. The particles can thus be comprised of a pure or mixed oxide, for example, $Al_2O_3$, $SiO_2$ or $TiO_2$, that are obtained from appropriate agglomerates or sols, for example, silica sols. Alternatively, the particles of the second fraction, as mentioned above in connection with the coating material, may be comprised of another material that is, at least at room temperature, sparingly soluble or insoluble in water, or they may be comprised of a core of any material and an exterior skin or shell of one of the aforementioned materials.

Figure 1:
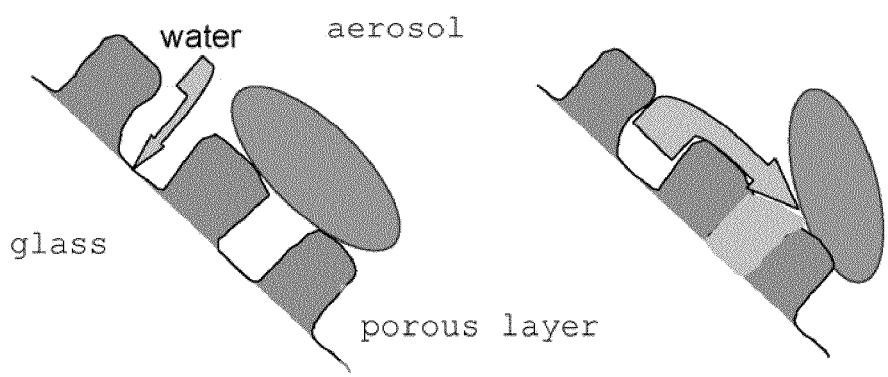
FIG. 1 is a schematic illustration showing that, when the water quantity is sufficient, a particle that is resting on the porous surface of the inventive coating will be washed out and carried away.
Figure 2:
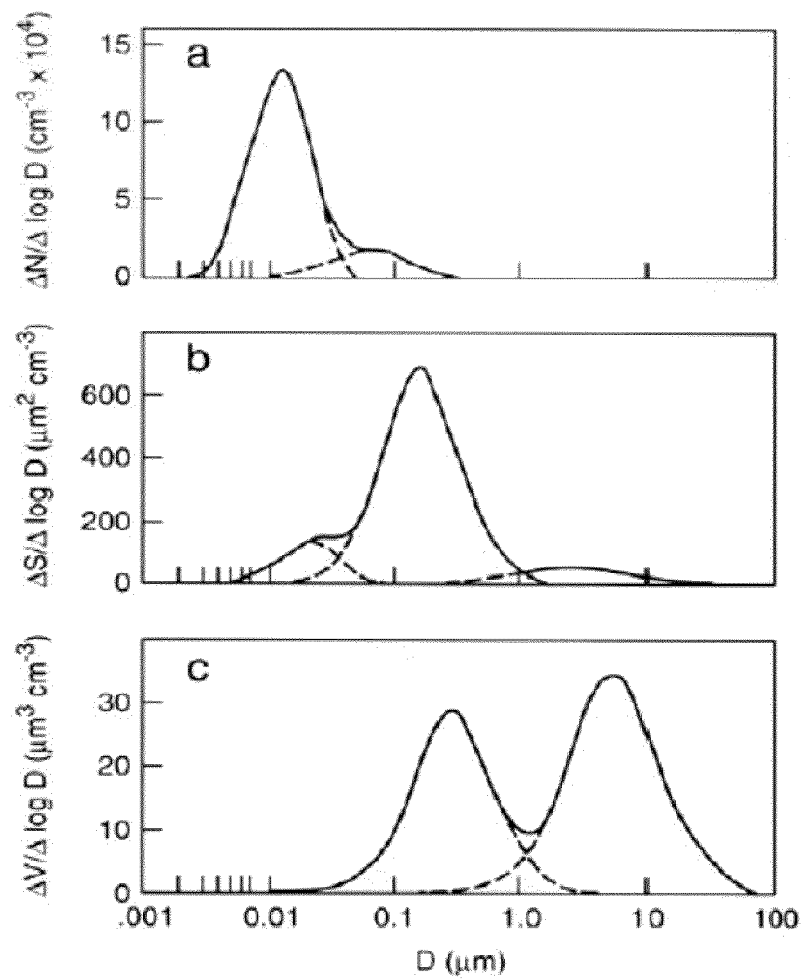
FIG. 2 shows a typical size distribution of urban aerosol, wherein the number density distribution in the form dN(r)/d log(r) is plotted against the logarithm of the particle radius r and, analogously, for the surface distribution or volume distribution the parameters dS/d log(r) and dV/d log(r), wherein a: number spectrum; b: surface spectrum; c: volume spectrum.
Figure 3:
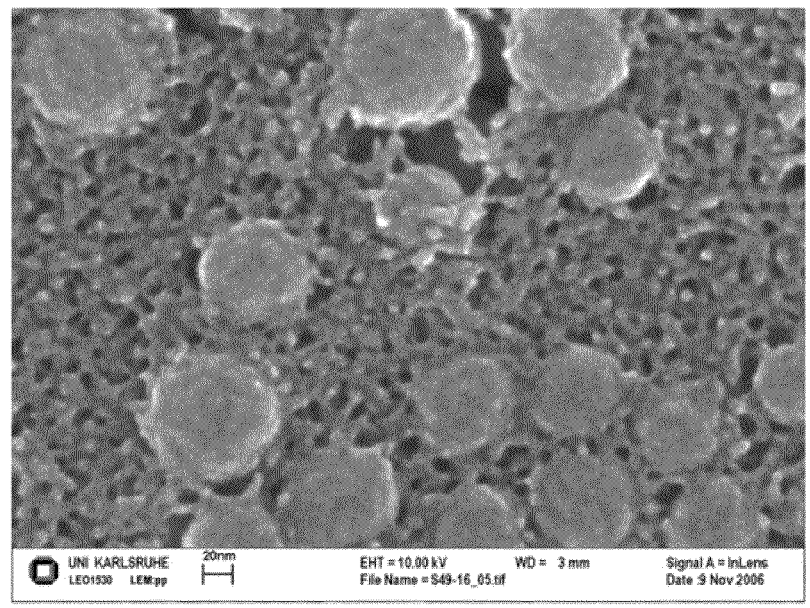
FIG. 3 shows an SEM image of the pore structure of the inventive coating.
Figure 4:
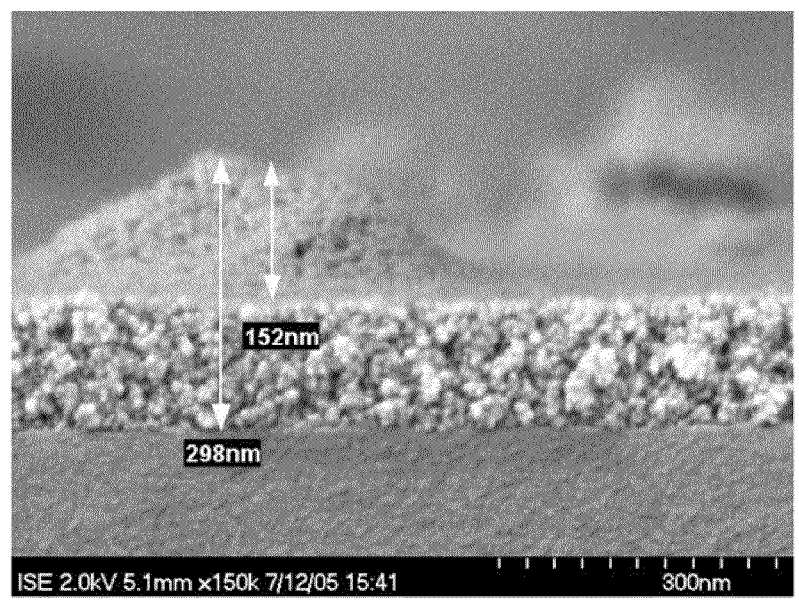
FIG. 4 shows a relief structure of the inventive coating imparted by the particles of the second fraction with an irregular spacing of the individual cones in the range of approximately 20 nm to 200 nm; the nano cones are especially easily recognizable at the fracture edge.
Figure 5:
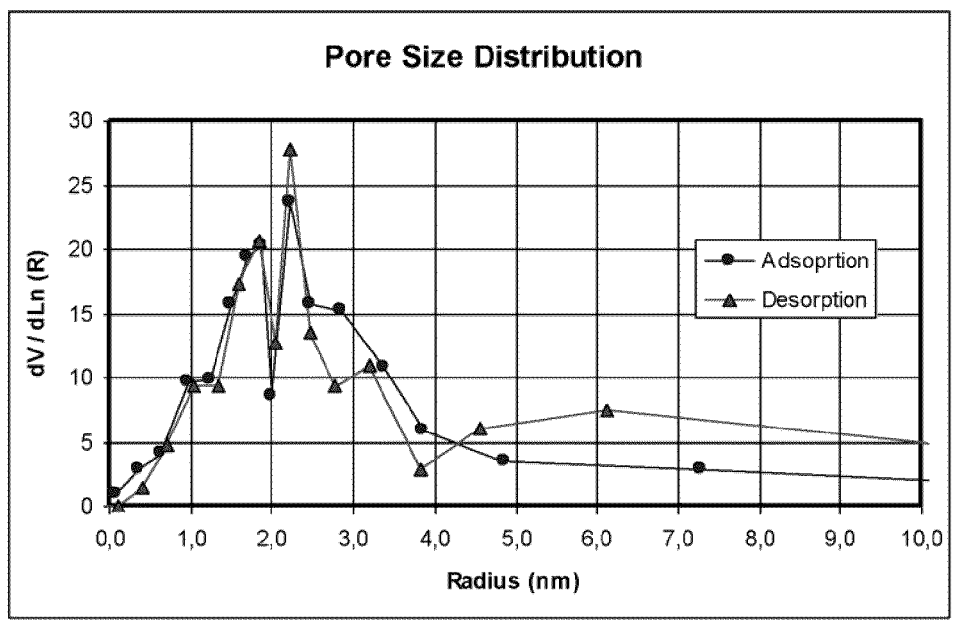
FIG. 5 shows pore size distribution.

By producing the first particles with the aid of sol-gel technology by using the solvents usable in accordance with present invention, these particles have pore diameters with a maximum in the range of below 6 nm. More preferred, the maximum of the pore distribution is at approximately 1.5-4 nm. Even the larger particles can have such pores. Such porous particles are obtainable commercially. Whether the larger particles per se have on their surface pores or not is however not critical for the realization of the invention because they are enveloped by the first smaller particles so that their outermost surface or the envelope in which they are embedded has pores in any case.

The smaller particles have as a result of their manufacture in general an irregular shape, i.e., they are not spherical or approximately spherically shaped. In contrast to this, the larger particles are preferably spherical (globular) or approximately spherical. The term “approximately spherical” is to be understood to include also ellipsoides or egg-shaped forms or such forms that have smaller irregular structures on their surface inasmuch as their body has a spherical base shape.

The weight or mass ratio of the smaller particles in relation to the larger particles is preferably at approximately 25:1 to 1:5, even more preferred at 5:1 to 1:1 and especially preferred at approximately 1.5:1 to 1.2:1. The number of the smaller particles relative to the larger particles can be, roughly estimated, at approximately 1000:1 to 20:1, preferably at approximately 200:1 to 40:1.

The larger particles are covered in the coating by a thin layer of the smaller particles so that on their “outer skin” or envelope they also have pores; however, they project from the layer that is formed by the smaller particles on the substrate. They are used in a quantity that has the effect that their spacing relative to one another is mainly in the range of 20 to 200 nm, measured from cone to cone of particles. In this way, a coating with three different pore sizes on its surface is created (pores are to be understood as upwardly open intermediate spaces in the material): The first pore size is determined by the spacings of the larger particles relative to one another; the second by the spacings of the smaller particles relative to one another; and the third by the pores in the smaller particles.

These surfaces allow water droplets to spread and have a small contact angle. The property is effected by a capillary action of the porous layer. The water penetrates into the pores and in this way ensures a small contact angle at the outer visible boundary layer. The observed hydrophilic character of such layers differs in principle from that of photocatalytic $TiO_2$ layers that is of a chemical nature. The porous layer according to the invention has in contrast to other hydrophilic layers a physical separating effect. Water can penetrate into the layer, but not an aerosol particle. It remains on the surface. When the water quantity is sufficient, a particle that is resting on the porous surface will be washed out and carried away. In this way, even hydrophobic aerosols can be removed that are not wetted by water because water, as a result of its high surface energy, practically will displace any physisorbed material. It is decisive in this connection that the water can pass as unimpaired as possible underneath the adhesion surface of an adhering particle (see FIG. 1).

For this purpose and for reducing the solid body contact, the adhesion surface between the aerosol particle and the coating surface is significantly reduced relative to layers of the prior art as a result of the pores provided in accordance with the present invention and a certain roughness that is caused thereby. The particles of the second larger fraction have a diameter distribution with a focus in the range of approximately 80 nm to 300 nm and generally are approximately or completely globular. The maximum of the pore diameter size distribution of the smaller particles, with which they are covered, is preferably below 6 nm. The pores are thus so small that only gases and liquids but not solid aerosol particles can penetrate into the pores. FIG. 2 shows a typical size distribution of urban aerosol. In this connection, the number density distribution in the form $dN(r)/d \log(r)$ is plotted against the logarithm of the particle radius r and, analogously, for the surface distribution or volume distribution the parameters $dS/d \log(r)$ and $dV/d \log(r)$. In this context, a means number spectrum; b: surface spectrum; c: volume spectrum.

The porous surface of the layer according to the invention is matched to the particle size distribution of the ultra-fine dust (diameter 10 nm) and shows relative to it a correspondingly reduced adhesion surface. Particles that are newly formed from the gas phase by nucleation have a typical size between 10 nm and 60 nm wherein for nano particles<10 nm a liquid form is assumed. The diffusion rate of the ultra-fine dust is high, therefore it coagulates after a short residence time to larger particles. The ultra-fine dust however because of its high particle number in connection with a high diffusion rate also leads to primary soiling of the glass surface to be protected. Therefore, the entire surface of the inventive protective layer on glass is furnished with the described nanoscale structure. FIG. 5 shows of such layer the pore radii distribution with a maximum of 2 nm, measured with an ellipsometer. The pore radii distribution is broad and shows that also larger pores may be present. In addition to the nanoscale porous basic structure, the layer contains a secondary structure that has larger pores primarily in a range of 5-20 nm and that serves for repelling particles in the average size range of about 300 nm. This pore structure is confirmed by images obtained by a scanning electron microscope and can be easily recognized. It is realized by the spacings between the smaller particles (FIGS. 3 and 4).

The SEM images also show, in addition to the pore structure, a further structural unit that is significantly larger. This concerns the particles of a size up to 300 nm of the second fraction that impart to the layer according to the invention a relief structure with an irregular spacing of the individual cones in the range of approximately 20 nm to 200 nm. The nano cones are especially easily recognizable at a fracture edge (FIG. 4).

Figure 6:
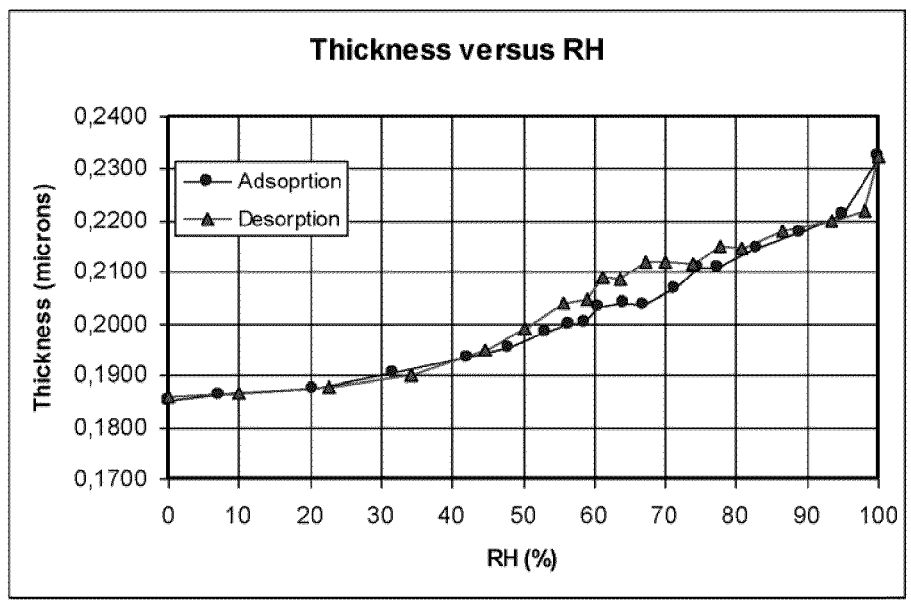
FIG. 6 shows thickness versus relative humidity (RH).

The relief structure has the effect that at high humidity a water film that is up to 50 nm thick will condense on the surface of the layer and will make more difficult adhesion of dirt particles. The formation of the water film is confirmed by the ellipsometric determination of the layer thickness as a function of the relative humidity (RH) (see FIG. 6). This Figure shows the determination of the total layer thickness of a porous layer, coated with a water film, as a function of the relative humidity, measured by an ellipsometer.

For producing the desired relief structure, instead of $SiO_2$ particles, as mentioned, any other particles, for example, $Al_2O_3$ particles or aggregated $TiO_2$ particles or mixtures thereof can be used. $TiO_2$ particles impart to the layer an additional photocatalytically active cleaning effect. The particles must only be sufficiently large so that they can form the desired relief structure.

The layer according to the invention repels dust and can be easily cleaned not only with respect to organic dirt, as is the case in photocatalytic layers, but additionally also inorganic dirt. The layer according to the invention forms because of its relief structure of nano cones at a relative humidity of 50% to 70% already a sufficiently thick water film that displaces physisorbed aerosol particles. Rain, that is always required in case of a photocatalytic layer in order for the decomposed organic aerosols to be washed off the surface is not necessarily required for the layer according to the invention. The inventive layer is of course also cleaned by rain that however must occur only rarely and moreover may be contaminated severely with aerosols. In this connection, the advantageous separating effect of the layer is helpful. The inventive layer increases the transparency of glasses furnished therewith and does not reduce it as is the case for $TiO_2$ that has a higher refractive index than glass. In this way, it is especially suitable for use in solar energy application.

The manufacture of the coating material according to the invention can be realized by means of conventional methods, for example, by means of the sol-gel technology. As already mentioned before, particles in the size range of the second larger particles are commercially available. They can also be easily produced in a variety of methods that are known in the prior art, for example, by means of the Stöber process. The smaller particles are preferably produced by means of the sol-gel method in situ in the first solvent. The larger particles can be added after completion or already during the course of hydrolytic condensation of the appropriate materials. Finally, the obtained mixture is diluted with the second solvent in a suitable quantity.

The coating material in this form may optionally be stored. For producing the coating according to the invention, it is applied onto the substrate, for example, sprayed on, or applied with the suitable device, or the substrate is pulled out of the coating material.

Subsequently, the layer is dried at room temperature or at increased temperature for a sufficiently long time until the solvents are removed. In order to increase adhesion strength and wear resistance, the layer can also be conditioned at substantially higher temperatures, for example, 15 minutes at 250 to (preferably) approximately 550° C. At this temperature, moreover Si—C bonds are destroyed so that, in case of the presence of organic components in the particles (which is however less preferred), they can also be removed finally during conditioning.

EXAMPLE 213 g tetramethoxysilane in 1,500 g of ethanol are hydrolyzed with 125 g 0.1 n aqueous ammonia solution. After two hours, an aqueous dispersion of 8.4 g of $TiO_2$ agglomerate (P25, Degussa company) in 1,680 g water and 16.4 g aqueous silica sol that contains 100 nm particles (Levasil 50/50%, H.C. Starck company) are added to the hydrolyzed material. The mixture is subsequently diluted with 5,500 g of 1-methoxy-2-propanol. The thus obtained coating solution can be applied by immersion onto glass tubes.

For conditioning the layer the coated glass substrate is exposed for 15 min to a temperature of 550° C. A coating according to the invention is obtained.

Figure 7:
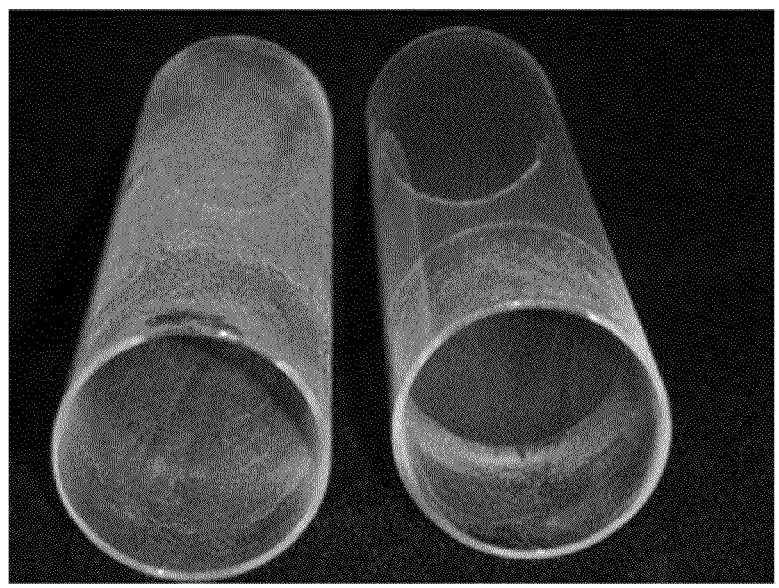
FIG. 7 illustrates the dust-repelling action of a layer according to the invention on a glass tube at a temperature of 21° C. and a relative humidity of 50% in comparison to an uncoated glass tube.

FIG. 7 demonstrates the dust-repelling action of a layer according to the invention on a glass tube at a temperature of 21° C. and a relative humidity of 50% in comparison to an uncoated glass tube. The uncoated reference glass tube is shown to the left, the right glass tube is coated with the exception of its front edge with the coating according to the invention.

What is claimed is:

1. A coating material comprising:
 (a) first oxidic particles produced by hydrolytic condensation in a size range of 5-20 nm, wherein the first particles have pores with a maximum of a pore diameter distribution of below 6 nm,
 (b) second particles of a diameter in a size range of 80-300 nm,
 (c) a first water-containing solvent in which the starting material for the oxidic particles formed by hydrolytic condensation is soluble and which enables or enhances hydrolysis and condensation of the starting material, and
 (d) at least one second solvent, selected from the group consisting of alcohols, ethers, organic acids, esters, ketones, amines, and add amides, of the formulas
 ROH,
 $ROR^1$,
 RCOOH,
 $RCOOR^1$,
 $RC(O)R^1$,
 $RCONR^2_2$,
and mixtures thereof, wherein R and $R^1$ are optionally the same or different and have the meaning of unsubstituted or hydroxyl, —$NHR^2$, amido, imino, —$COOR^2$, and/or alkoxycarbonyl substituted, saturated or unsaturated, straight-chain or branched alkyl, alkoxy or polyether alkoxy; or wherein R and $R^1$ are linked with one another by forming a ring with formation of an unsubstituted or hydroxy, —$NHR^2$, amido, imino, —$COOR^2$, and/or alkoxycarbonyl substituted or unsaturated, straight-chain or branched alkylene, oxyalkylene or alkylene (poly)oxyalkylene group; with the proviso that R is not an unsubstituted alkyl when the solvent is of the formula ROH, and wherein $R^2$ optionally may be the same or different and is H or $C_1$ to $C_6$ alkyl.

2. The coating material according to claim 1, wherein the first particles obtained by hydrolytic condensation have been obtained from hydrolyzable and condensable silanes and/or from hydroxides and/or alkoxides of two-, three-, four-, or five-valent ions of the main groups of the periodic table and the transition metals.

3. The coating material according to claim 1, wherein the first particles have been obtained from compounds of magnesium, calcium, boron, aluminum, silicon, germanium, tin, titanium or zirconium or a mixture thereof.

4. The coating material according to claim 2, wherein the first particles have been obtained partially or complete from silane tetraalkoxides or silane trialkoxides.

5. The coating material according to claim 1, wherein the maximum of the pore diameter distribution is in the range of 1.5 to 4 nm.

6. The coating material according to claim 1, wherein the second particles are oxidic particles.

7. The coating material according to claim 6, wherein the second particles are comprised of a pure or mixed oxide or of a mixture of particles of a pure oxide.

8. The coating material according to claim 1, wherein the second particles are substantially spherical and/or have an average diameter of 100 to 150 nm.

9. The coating material according to claim 1, wherein the residue R in the formula for the second solvent has 1 to 10 carbon atoms and, inasmuch as it contains a polyether alkoxy group or an alkylene polyoxyalkylene group, this group contains 2 or 3 alkylene oxide units.

10. The coating material according to claim 9, wherein the second solvent is selected from the group consisting of alkoxy alcohols and polyalkoxy alcohols.

11. A substrate provided with a coating produced of a coating material according to claim 1.

12. A substrate according to claim 11, wherein the substrate is a plate glass for covering photovoltaic panels or water heating collectors or a tubular glass for solar water heating.

13. A method for producing the coating material according to claim 1, comprising the following steps:
    (i) providing at least one compound, selected from the group consisting of hydrolyzable and condensable silanes and hydroxides and alkoxides of two-, three-, four-, or five-valent ions of the main groups of the periodic table and the transition metals,
    (ii) dissolving the compound(s) according to (i) in the first solvent according to (c) as defined in claim 1, such that these compound(s) are subjected to hydrolytic condensation,
    (iii) adding second particles that have a diameter in the size range of 80-300 nm, into the solvent according to (c) as defined in claim 1 during or after the hydrolytic condensation according to (ii),
    (iv) adding the second solvent according to (d) as defined in claim 1 during or after hydrolytic condensation according to (ii) and before or together with or after adding the second particles.

14. A substrate provided with a coating, wherein the coating comprises at least a first particle fraction and a second particle fraction, wherein particles of the first particle fraction have a diameter in a size range of 5-20 nm and particles of the second particle fraction have a diameter in a size range of 80-300 nm, wherein the particles of the second particle fraction have an average spacing relative to one another, measured from cone to cone of these particles, of 20-200 nm on average, wherein the particles of the first particle fraction have pores with a pore radius distribution whose maximum is between 1 and 6 nm.

15. The substrate according to claim 14, wherein the second particle fraction comprises particles in a size range of 100 nm to 200 nm.

16. The substrate according to claim 14, wherein the particles of the first particle fraction are oxidic particles, selected from the group consisting of oxides of two-, three-, four- or five-valent ions of the main groups of the periodic table and the transition metals.

17. The substrate according to claim 16, wherein the particles of the first particle fraction are comprised entirely or predominately of optionally organically modified silicon dioxide.

18. The substrate according to claim 14, wherein the particles of the second particle fraction are comprised of a pure or mixed oxide, selected from the group consisting of oxides of aluminum, silicon, germanium, tin, zirconium and titanium.

19. The substrate according to claim 14, wherein the particles of the first particle fraction, at least on the surface of the coating, have an average spacing of 5-20 nm relative to one another.

20. The substrate according to claim 14, wherein the substrate is plate glass or tubular glass.

21. A method for producing the coated substrate according to claim 14, comprising the following steps:
    (i) applying a coating material onto a substrate, wherein the coating material comprises:
        (a) first oxidic particles produced by hydrolytic condensation in a size range of 5-20 nm,
        (b) second particles of a diameter in a size range of 80-300 nm,
        (c) a first water-containing solvent in which the starting material for the oxidic particles formed by hydrolytic condensation is soluble and which enables or enhances hydrolysis and condensation of the starting material, and
        (d) at least one second solvent, selected from the group consisting of alcohols, ethers, organic acids, esters, ketones, amines, and acid amides, of the formulas
        ROH,
        $ROR^1$,
        RCOOH,
        $RCOOR^1$,
        $RC(O)R1^1$,
        $RCONR^2_2$,
        and mixtures thereof, wherein R and $R^1$ are optionally the same or different and have the meaning of unsubstituted or hydroxy, $-NHR^2$, amido, imino, $-COOR^2$, and/or alkoxycarbonyl substituted, saturated or unsaturated, straight-chain or branched alkyl, alkoxy or polyether alkoxy; or wherein R and $R^1$ are linked with one another by forming a ring with formation of an unsubstituted or hydroxy, $-NHR^2$, amido, imino, $-COOR^2$, and/or alkoxycarbonyl substituted or unsaturated, straight-chain or branched alkylene, oxyalkylene or alkylene (poly)oxyalkylene group; with the proviso that R is not an unsubstituted alkyl when the solvent is of the formula ROH, and wherein $R^2$ optionally may be the same or different and is H or $C_1$ to $C_6$ alkyl;
    (ii) drying/conditioning the coating material at a temperature between room temperature and approximately 600° C.

22. The method according to claim 21, wherein the substrate is a glass substrate.

23. The method according to claim 21, wherein the coating material is dried and conditioned for approximately 5 to 40 min. at approximately 550° C.

24. The method according to claim 21, for providing a coating that is dust-repellent and aerosol-repellent and is cleanable by rain washing off adhering inorganic and organic dirt.

25. The method according to claim 24, wherein the substrate is a plate glass or a tubular glass.

* * * * *

UNITED STATES PATENT AND TRADEMARK OFFICE
CERTIFICATE OF CORRECTION

PATENT NO. : 8,354,165 B2  
APPLICATION NO. : 12/674178  
DATED : January 15, 2013  
INVENTOR(S) : Walther Glaubitt et al.

It is certified that error appears in the above-identified patent and that said Letters Patent is hereby corrected as shown below:

In the Specification

In column 1, line 59, "NO," should read -- $NO_x$ --.

In column 1, line 60, "SO" should read -- $SO_x$ --.

In column 2, line 9, "Silicafforschung" should read -- Silicatforschung --.

In the Claims

In column 10, line 44, "$RC(O)R1^1$" should read -- $RC(O)R^1$ --.

Signed and Sealed this  
Eleventh Day of November, 2014

Michelle K. Lee  
*Deputy Director of the United States Patent and Trademark Office*